June 26, 1973 YOSHIO KOMIYA 3,741,839
METHOD OF MANUFACTURING FLEXIBLE OPTICAL FIBER STRAND FOR
TRANSMITTING IMAGES AND APPARATUS THEREFOR
Filed Nov. 3, 1969 2 Sheets-Sheet 1

INVENTOR.
YOSHIO KOMIYA
BY McGlew and Toren
Attorneys

INVENTOR
YOSHIO KOMIYA
BY McGlew and Toren
ATTORNEYS

United States Patent Office 3,741,839
Patented June 26, 1973

3,741,839
METHOD OF MANUFACTURING FLEXIBLE OPTICAL FIBER STRAND FOR TRANSMITTING IMAGES AND APPARATUS THEREFOR
Yoshio Komiya, Tokyo, Japan, assignor to Canon Inc., Tokyo, Japan
Filed Nov. 3, 1969, Ser. No. 873,580
Claims priority, application Japan, Nov. 7, 1968, 43/81,435
Int. Cl. B65h 81/00
U.S. Cl. 156—174
1 Claim

ABSTRACT OF THE DISCLOSURE

Method and apparatus for manufacturing flexible optical fiber bundle for transmitting images in which the layers of fibers are formed by winding the fibers on a slanted surface formed on a winding drum.

---

The present invention relates to the method and apparatus of manufacturing a flexible optical fiber bundle (so-called fiber-scope) used for transmitting images and to the apparatus therefor. Fiber-scope has its ends polished and lens system and protective covering are attached thereto, and is used for such various applications as medical and industrial purposes.

In a fiber-scope single fibers must be so positioned at the both ends of the fiber bundle that each of the single fibers is corresponding to each other and that each fiber must be adjoining each other in a closed packed state.

In order to satisfy the conditions mentioned above, it is usually done that a number of such ring shape members, as having at their portions thin layers of correctly arranged fibers, are laid up and fixed in place then cut such portion to make the required fiber-scope.

In this case as a method of making such ring shaped members as having thin layers of correctly arranged fibers, such methods have been suggested that fibers of predetermined width are wound up in a parallel manner by a wind-up frame or a wind-up drum, or that fibers are vertically wound up by wind-up frame or wind-up drum. Patent Gazettes Toku-Ko-Sho-41-4038 and Toku-Ko-Sho-43-463 show methods related to the former methods mentioned above, which are most commonly used. However, since single fibers used are of such fine dimension as 10 microns to 20 microns, it is difficult to synchronize the speed of movement of a guide frame and the diameter of the fiber because of the limit of the accuracy of the machine. At the same time, it will be difficult to make close and dense layers of fiber ribbon on account of charging of static electricity and effect of wind.

The latter method is well known through Patent Gazette Toku-Ko-Sho-42-10413, and since in this method layers of fiber will be formed between vertical pins, the stability of the layers will be poor, and the layers are apt to become out of shape as they are peeled off between pins. At the same time as only a single layer of the fibers can be obtained at a time it takes intensive labor to lay up the layers. The present invention is intended to overcome said difficulties and to provide method for mass production of close and dense layers of fibers.

The present invention lies in installing means to provide slanted surface to portions of the wind-up drum, for instance a support or a stand with such function, thereby forming the layers of fibers at such slanted portions. Thus it will be possible to form the fibers in layers regardless of the accuracy of the speed of the guide frame by taking advantage of the tension involved, and to retain the fiber layers in stable state over the above mentioned support.

Figure 1:
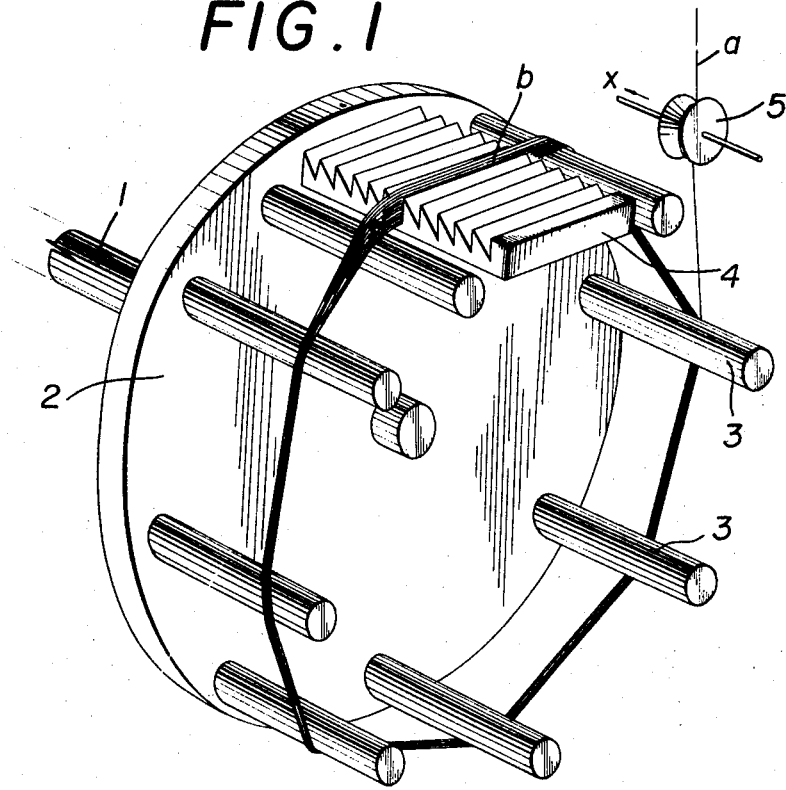
Figure 2:
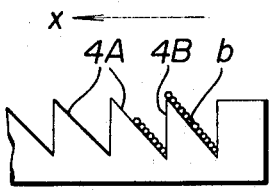
Figure 3:
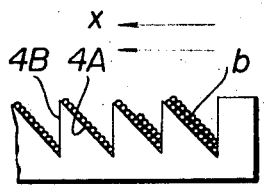
Figure 4:
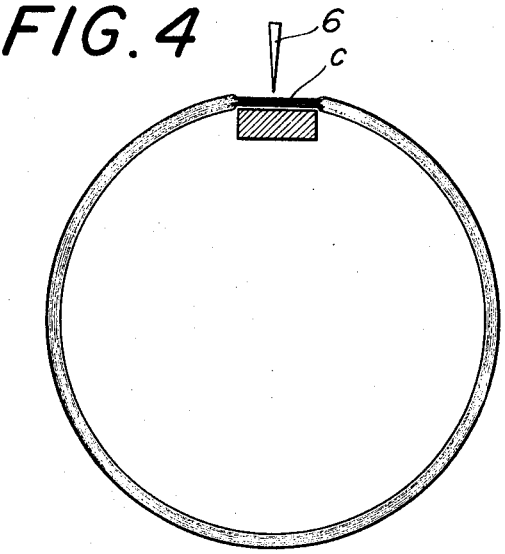
Figure 5:
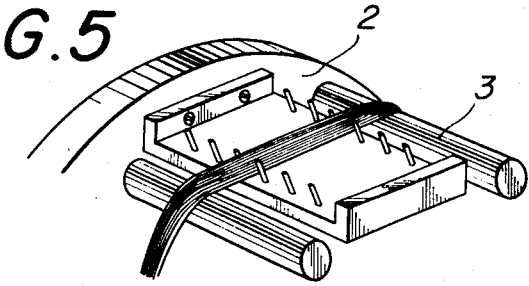
Figure 6:
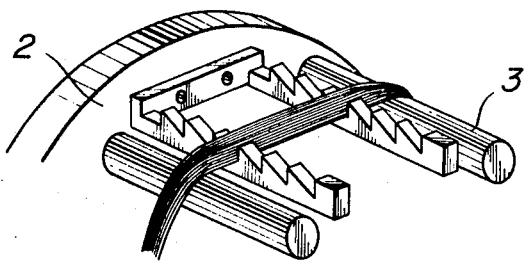

The present invention will be described in detail referring to the attached drawings in which:

Drawings show examples of the present invention, wherein FIG. 1 is an oblique view of the wind-up frame used in the present invention, FIG. 2 is an enlarged cross-sectional view of the slanted support portion in FIG. 1, FIG. 3 is also an enlarged cross-sectional view schematically showing the intermediate step when ribbons (or bundle) are wound up in multi-layers, FIG. 4 is a schematic drawing showing a step of cutting the ribbons (or bundle) laid up in multi-layers, then FIG. 5 and FIG. 6 show other examples of such slanted support as shown in FIG. 1.

As a means to provide a surface which is smoothly slanted against the direction of rotating axis and is parallel to the direction of winding, besides the supports 4 shown in FIG. 1, such structure shown in FIG. 5 as positioning slanted pins in a flat stand, or slanted surfaces provided by two or more of a flat board having slanted portions at one side as shown in FIG. 6 may be used, or further slanted surfaces may be made by cutting out portions of a circumference of a cylindrical body.

Next, the present invention shall be explained in detail by way of an example according to the drawings.

In FIG. 1, a wind-up frame used in an example of the present invention is shown. In the same drawing, the wind-up frame is made by erecting a group of cylindrical columns 3 on a circular plate 2 having a shaft 1. To one side of the frame, a support 4, which is made of metal or plastics and has, as shown in the drawing, such slanted surfaces as being parallel to the direction of winding and being smoothly slanted against the direction of rotating axis, is provided. A single fiber $a$ is guided by a guide pulley 5 which is traversed in synchronism with the number of rotation of the shaft 1, then is wound by the group of cylindrical columns 3, forming close and dense layer $b$ of fibers on a surface 4A shown in FIG. 2 at the support 4. That is, as the shaft 1 makes one rotation, the single fiber $a$ slides, by tension, along the surface 4A and reaches the surface 4B.

Further, as the shaft makes another rotation, the guide pulley being synchronized with said rotation is moved to the direction of X, and the single fiber $a$ slides by tension along the surface 4A and reaches and comes adjacent to the fiber which has already been wound by the previous rotation. Then, as shown in FIG. 2, a layer of fiber ribbon is formed by winding certain amount of the single fibers $a$. By repeating this process several times, a fiber ribbon with multi-layers may be obtained as shown in FIG. 3.

The angle between the plane 4A and the plane 4B is suitably decided so as to depend on how big the tension of the single fiber $a$ is, and diameter and shape of the single fiber.

As glass fibers do not have great strength it is better to give such tension to the same as being maximum allowable under its strength. The larger the tension used, the smaller the angle of inclination may be used. As to the diameter of the fiber, as it becomes larger, the angle of inclination must be made that much larger.

For example said angle will be decided depending on the frictional force between the fiber and the slanted surface, and as the frictional force becomes smaller the angle of inclination must be made larger. From the standpoint of the structure of support, the angle of inclination must be made large in the case of the support shown in FIG. 1 and the support with slanted surface made by cutting out portions of a circumference of a cylindrical body. In the slanted supports shown in FIG. 5 and FIG. 6 (slanted pin type and the type with two or more flat boards with slanted portions in one side, respectively), the diameter of glass fiber was 0.015 mm., and the pin having a diameter of 0.5 mm. and a length of 3 mm. was made of brass having smooth surface which was chromium plated. The distance between pins was 30 mm., the circumference of the wind-up frame was 1 meter, and the tension was a few grams, while the angle of inclination was about 25 degrees against the direction of axis of the wind-up frame.

The wound fiber layers *b* are to be fixed together by adhesive, then the cylindrical columns are loosened and fibers being taken out thereof, thus stable, close and dense ring shape member may be obtained. The ring shape members thus obtained are laid up in multi-layers by 3 mm. height and fixed together. Care should be exercised to closely put together the layers so that there will be no gap between layers, then a center portion of the multi-layers *c* of fibers is cut by a cutter 6 to obtain prescribed fiber strand.

For fixing the bundled portion, for example, a portion of the thin layers closely put together will be fixed together with adhesive for a length of 30 mm. out of the circumference of fiber ring having a circumference of 1 meter, then the center of thus fixed portion is cut open to make the fiber bundle a straight lined shape, and both cut ends are polished. The cut end will have a size of 3 mm. square.

What is claimed is:

1. A method of making a flexible optical fiber bundle for use in transmitting images by winding a continuous single optical fiber in the circumferential direction on a circumferentially extending guide surface which rotates about a centrally arranged axis of rotation, and, as it is wound, moving the optical fiber along the guide surface in the direction of the axis of rotation of the guide surface so that adjacent surfaces of the wound optical fiber are in contact with one another, wherein the improvement comprises introducing a support surface in the circumferential path of the guide surface with the support surface extending in the direction of the axis of rotation of the guide surface and rotating with the guide surface about its centrally arranged axis of rotation, disposing the support surface at an acute angle to the axis of rotation of the guide surface with the support surface diverging from the axis of rotation in the direction in which the optical fiber is moved as it is wound on the guide surface so that the adjacent wound surfaces of the optical fiber on the support surface extending in the direction in which the optical fiber is moved as it is wound on the guide surface are spaced a greater distance from the axis of rotation due to the configuration of the support surface, forming a layer of the optical fibers consisting of a plurality of the adjacent wound surfaces in a ring shape on the guide surface and the support surface, reversing the direction of movement of the optical fiber in the direction opposite to the direction in which it is wound and then reversing the direction of movement back to the direction in which the optical fiber is wound on the guide surface and continuously winding the optical fiber for forming a number of superimposed layers of the optical fiber with successive layers spaced outwardly from the axis of rotation of the guide surface relative to the preceding layers, fixing the wound fibers together with an adhesive cutting the ring shaped layers of optical fiber in a direction perpendicular to the winding direction of the optical fiber and polishing the cut ends of the optical fiber.

References Cited
UNITED STATES PATENTS

| | | | |
|---|---|---|---|
| 3,104,191 | 9/1963 | Hicks, Jr. et al. | 156—174 |
| 3,472,718 | 10/1969 | Siegmund | 156—174 |
| 3,215,029 | 11/1965 | Woodcock | 156—174 X |
| 3,514,351 | 5/1970 | Mukai | 156—174 |

FOREIGN PATENTS

| | | | |
|---|---|---|---|
| 686,711 | 5/1964 | Canada | 156—175 |

CARL D. QUARFORTH, Primary Examiner

E. E. LEHMANN, Assistant Examiner

U.S. Cl. X.R.

156—175; 350—96